Sept. 9, 1969 A. J. GEHRING ET AL 3,465,866

STRUCTURE PROVIDING PRINTED TRANSLATION OF CODED INFORMATION ON CODED MEMBER

Filed Nov. 15, 1965 3 Sheets-Sheet 1

INVENTORS
JAMES L. BRAXTON
HENRY J. GARDNER
EDWIN W. CREELLIN
ARTHUR J. GEHRING

BY

ATTORNEY

Sept. 9, 1969 A. J. GEHRING ET AL 3,465,866

STRUCTURE PROVIDING PRINTED TRANSLATION OF CODED INFORMATION ON CODED MEMBER

Filed Nov. 15, 1965 3 Sheets-Sheet 3

United States Patent Office 3,465,866
Patented Sept. 9, 1969

3,465,866

STRUCTURE PROVIDING PRINTED TRANSLATION OF CODED INFORMATION ON CODED MEMBER

Arthur J. Gehring, Fort Washington, and Henry J. Gardner, Lansdale, Pa., James L. Braxton, Moorestown, N.J., and Edwin W. Crellin, North Wales, Pa., assignors to Sperry Rand Corporation, New York, N.Y., a corporation of Delaware Filed Nov. 15, 1965, Ser. No. 507,917
Int. Cl. B41j *5/36;* G06k *1/04, 3/02*
U.S. Cl. 197—20 16 Claims

ABSTRACT OF THE DISCLOSURE

There is disclosed an interpreter device for a unit record, which stores information in both an upper and lower half, thereby increasing its storage capacity. Interpreting is done "on the fly" in that the unit record, the sensing means and the print means are all moving at the same time. Printing of the information recorded in the columns of the upper half of the unit record occurs on the top line and printing of information recorded in the columns of the lower half occurs on the bottom line.

This invention relates to an improved printing machine. More particularly, it is concerned with a machine capable of reading a coded punched card and for providing the decoded information on the same card.

Machines of this type, hereinafter referred to as "interpreters," have been used with a variety of forms of data carriers, each form thereof having one of various kinds of data representations. To simplify an understanding of this invention, description is limited to record cards wherein data is represented by one or more holes punched in several predetermined locations therein.

This invention is particularly adapted to be used with a form of record card designated as a "160-column" card. The particular code configuration is termed UNICODE.

A "160-column" card is a standard size card as is commonly used with taubulating systems. It consists of an upper field of eighty columns, each column containing six punchable positions to represent alphabetic or numeric information in UNICODE, and a lower field of eighty columns, each containing six punchable positions.

UNICODE is a modified excess-three binary code. Four of the six positions have binary order and are, respectively, $2^0$, $2^1$, $2^2$, $2^3$ or 1, 2, 4, and 8. The remaining two positions, utilized as zone bits, are used to indicate alphabetic information and other symbols.

In excess-three code, the usual binary number has a binary three added thereto. Thus, the number "one" in ordinary binary notion is 0001. In excess-three binary notation, it is 0100. Similarly, the number two, instead of being 0010 becomes 0101. The excess-three code, as is well known, is useful in performing machine computations. A particular advantage of using UNICODE is that complicated and/or expensive translation equipment is not needed in the input and output sections of processing equipment. UNICODE is machine compatible thereby effecting a considerable saving both in cost and speed of processing.

The "160-column" card is arranged so that only a single pass or traverse of the card is required in card processing. The columns progress from top to bottom and from left to right in numerical order, that is, the first column at the left of the upper field is column 1; the last column at the extreme right of the lower field is column 160. The first column in the lower field, at the left, immediately beneath column 1 is column 2. Thus, the upper field contains all the odd numbered columns 1, 3, 5, . . . 159 and the lower field contains the even numbered columns 2, 4, 6, . . . 160.

Although the invention is described in connection with a "160-column" card using UNICODE by way of illustration, no limitation is intended thereby, it being understood that a standard 90 column or 80 column card can be used with minor modifications by one ordinarily skilled in the art.

In accordance with one embodiment of this invention, a synchronous cyclically operable machine is described, having two continuously rotating print wheels, each having a complete set of alphanumeric characters about its periphery. Printing is accomplished by actuating a corresponding hammer to strike against its respective print wheel at the appropriate point of its cycle of revolution. The print receiving surface, such as the "160-column" card, and an ink transfer medium such as an inked ribbon, are oriented between the hammer and the print wheel. Functionally, the interpreter senses the "160-column" card, translates the UNICORE information, and fires the print hammer at the time the character corresponding to the sense UNICODE combination is in position adjacent the card.

The "160-column" card is transferred, sensed, and printed "on the fly," reducing the time necessary for such operations. Thus, the cards are continuously moved through sense and print stations in contrast to mechanisms of the prior art which feed card intermittently.

In a preferred embodiment, information is printed in two locations on the card, along the top edge, and along the bottom edge. Thus, two corresponding print wheels are provided. Since it is usually desirable that information recorded in consecutive columns be printed consecutively, columns 1 through 80, inclusive, are sensed and printed by one station, and columns 81 through 160, inclusive, by a second station. Effectively, the "160-column" card provides two columns for every one column of a standard 80 column card. Hence, since consecutive columns, desirably, should be printed consecutively, printing is not necessarily performed in alignment with the columns whose punched UNICODE information corresponds to the printed information. Instead, the data punched in the left half ofthe card is printed along the entire length of the card at the top, and the data punched in the right half of the card is printed along the entire card length at the bottom.

Using a separate sensing and printing station corresponding to the left and right halves of the card, respectively, the motion of the "160-column" card relative to one station need only be one-half the card length, for a complete card, effectively, to be read. The sensing stations are fixedly mounted on a movable carriage which moves with the card in the same direction as the card travels, though at about half its speed, in order to simplify printing along the entire top and bottom edge and to increase the time available for printing each column of information. Thus, the preferred embodiment provides an "on the fly" operation of three different components at the same time: the card, the data sensing photocells, and the print wheels. The card moves continuously through the machine while the sensing and printing operations are being performed. When the first card column comes into position to be sensed, the photocell carriage starts to move in a direction of card motion at a much lower rate of speed. The effect of carriage motion is to lengthen the printing time available for each card column and to extend the line of print to cover almost the full length of the card. Printing is accomplished by activating a hammer against the face of the character on the revolving print wheel. The intervening card receives an inked impression of the character.

A feature of this invention determines which of the two aligned odd and even columns is to be read in order to maintain the alternating sequence between the odd and even columns.

Thus, among the desiderata of this invention are the following: to provide an improved printer; to provide an improved low cost interpreter from a data carrier and to reproduce the information on that carrier in another form; to provide an improved interpreter of the synchronous cyclically operable type; to provide an improved interpreter wherein the data carrier to be sensed and to be printed is continuously moved through the machine; to provide an improved interpreter wherein the sensing station is continuously moved in the direction of data carrier motion; and to provide an improved interpreter for use with a "160-column" card.

Other objects and advantages of this invention, together with its construction and mode of operation, will become more apparent from the following description, when read in conjunction with the accompanying drawings, in which like reference symbols refer to like components and parts, in which.

Figure 3:
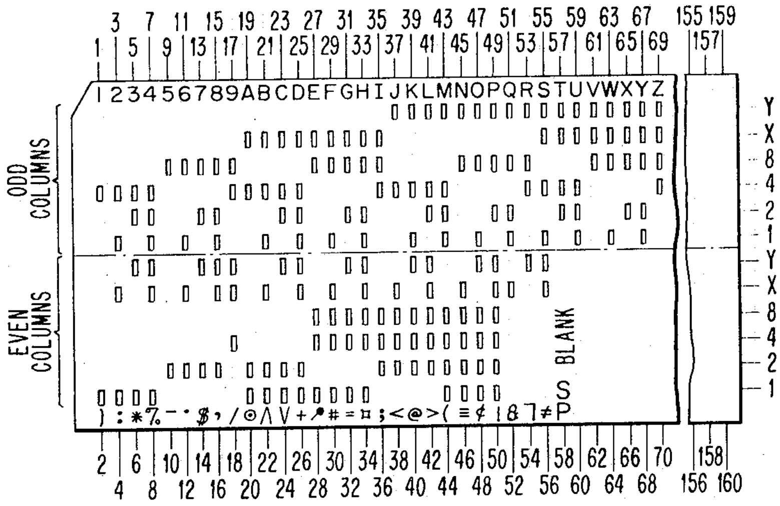
Figures 2, 2A:
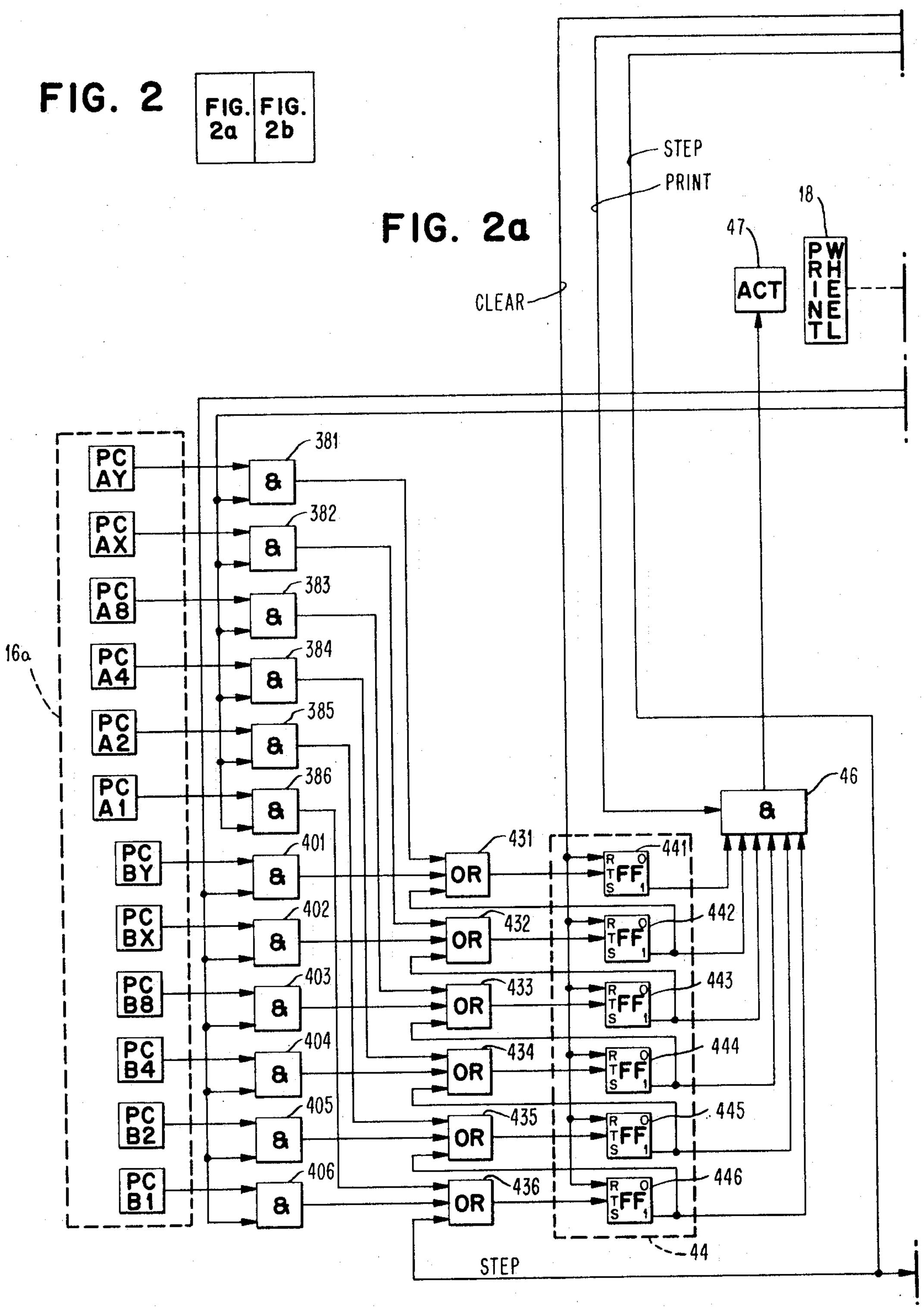
FIGURE 2 is a block diagram indicating the side by side relationship of FIGURES 2*a* and 2*b*.
Figure 2B:
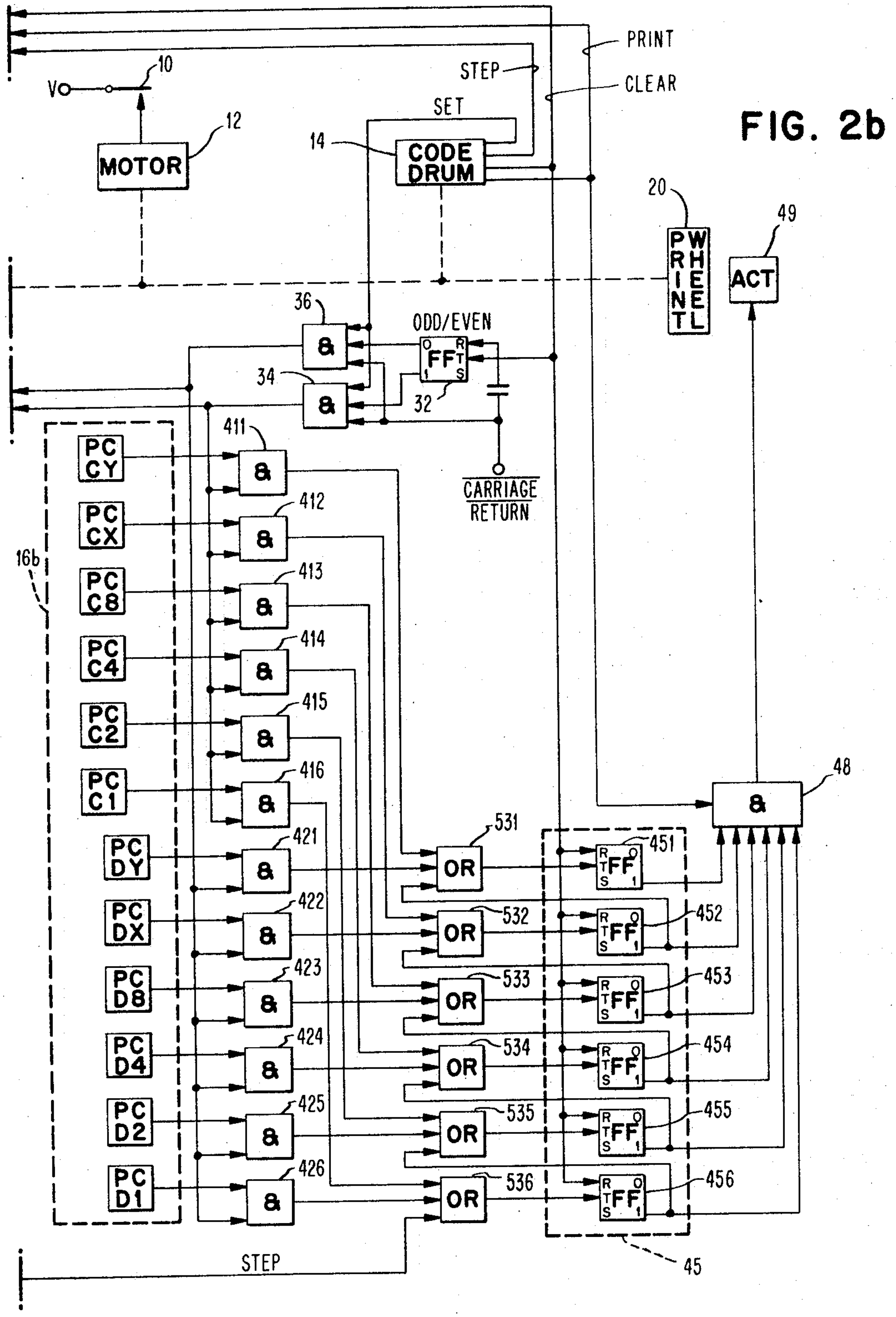

FIGURE 2*a* is a portion of the schematic in logical diagrammatical form;

FIGURE 2*b* is the remaining portion of the schematic in logical diagrammatical form;

FIG. 3 is an illustration of the form of punched card for use with one embodiment of this invention, showing the sequential order of the odd and even numbered card columns showing the coding employed in recording data on the card.

FIG. 2 shows a card 35 of a type suitable for use in conjunction with a machine constructed in accordance with one embodiment of this invention illustrating the columnar format of alternating the odd and even columns in the upper and lower halves of the card, respectively, and also illustrating the code perforations which can be recorded with the use of a six-bit code. The card can have the same physical dimensions as the standard Hollerith or 80-column card with index point positions arranged in columns and rows as in the well known 80-column card. However, by dividing the card in half along its length, and utilizing a column of six index positions in the upper half of the card as one card column, and a column of six index positions in the lower half of the card as another card column, it is readily apparent that the information recording capacity of the card is doubled so as to provide, in effect, a double deck card of 160 card columns. As shown in FIG. 3, the 80 columns in the upper half of the card are designated by odd numbers in series from column 1 at the left-hand edge of the card to column 159 at the right-hand edge of the card, hereinafter referred to as odd columns. Likewise, the columns in the lower half of the card are designated by even numbers, starting with column 2 at the left to column 160 at the right-hand edge of the card, hereinafter referred to as even columns. The six index positions within each column are designated running from the bottom to the top of the column as positions 1, 2, 4, 8, X and Y. The code employed in recording numerals is the XS–3 binary code which simplifies the processing of cards, so coded, in related card controlled processing equipment employing internally the XS–3 code, in that, by employing the same code on the record card, the necessity for translation from card code to internal code of the related processing machine is avoided.

The card is read in straight numerical sequence according to the numbering of the columns; that is column 1 is read first, then column 2, column 3, and so forth, in order, with reading taking place alternately in the odd and even columns.

Figure 1:
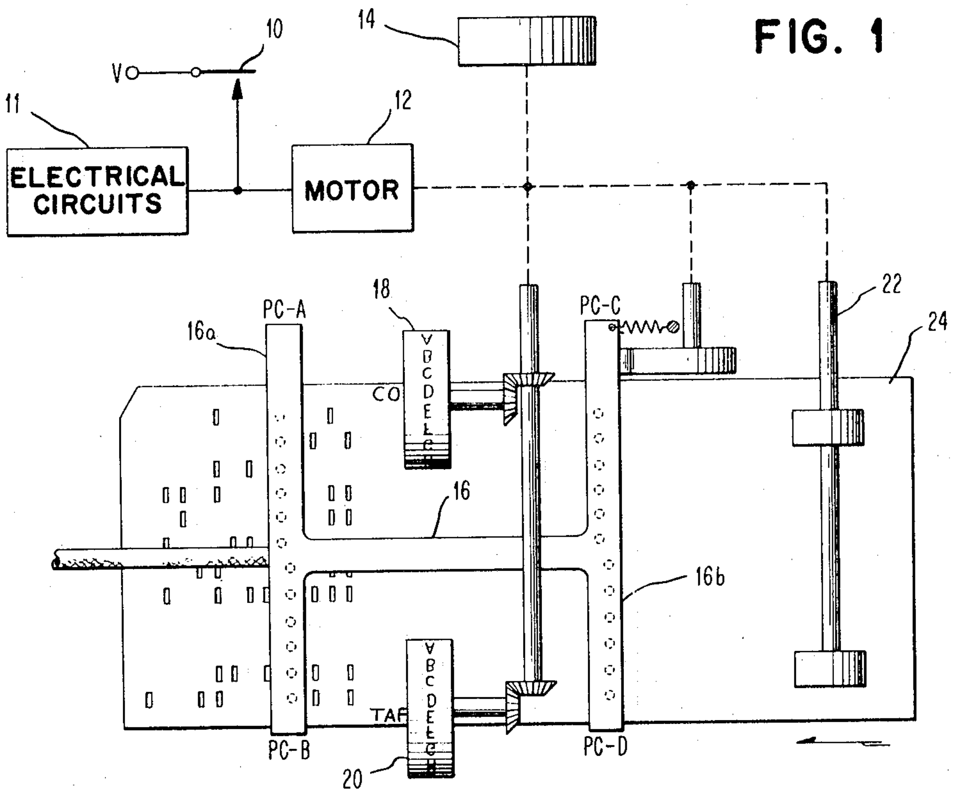
FIGURE 1 is a hybrid perspective view, partly in diagrammatic form, illustrating in a representative manner, various mechanical features of one embodiment of this invention.

A better understanding of this invention will become apparent from a reading of the following description in connection with FIGS. 1 and 2, which illustrate, in simplified form, various mechanical and electrical features, respectively, of the invention.

Referring to FIG. 1, there is shown a switch 10 which couples a voltage source V to a motor 12. The switch 10 also supplies power, when closed, to suitable electric circuits 11. The motor 12 is mechanically coupled to drive a code wheel drum 14, a pair of print wheels 18, 20, a photocell carriage 16, card rollers 22, and a picket knife cam (not shown).

One of a plurality of cards 24 is supplied from an input hopper (not shown), located at the right of FIG. 1, and passed, by means of the picker knife cam and the card rollers 22, in cooperative association under the upper and lower print wheels 18, 20, respectively, past the photocell carriage 16, towards the left, to an output hopper (not shown).

The print wheels 18, 20 continuously rotate synchronously with the code wheel drum 14 which provides an output signal indicative of the character in position to be printed by the print wheels 18, 20.

The photocell carriage 16 contains four sets of photocells: an upper left set of photocells PC–AY, PC–AX, PC–A8, PC–A4, PC–A2, PC–A1; a lower left set of photocells PC–BY, PC–BX, PC–B8, PC–B4, PC–B2, PC–B1; an upper right set of photocells PC–CY, PC–CX, PC–C8, PC–C4, PC–C2, PC–C1, and a lower right set of photocells PC–DY, PC–DX, PC–D8, PC–D4, PC–D2, PC–D1.

The alignment of the upper left set of photocells, PC–AY, PC–AX, PC–A8, PC–A4, PC–A2, PC–A1 is displaced from the alignment of the lower left set of photocells PC–BY, PC–BX, PC–B8, PC–B4, PC–B2, PC–B1 by a dimension equal to one-half the distance between columns. In a similar manner, the upper right set of photocells PC–CY, PC–CX, PC–C8, PC–C4, PC–C2, PC–C1 is displaced from alignment with the lower right set of photocells PC–DY, PC–DX, PC–D8, PC–D4, PC–D2, PC–D1 by half the distance between columns.

The mean distance between the left-most sets of photocells PC–A, PC–B and the right-most set of photocells PC–C, PC–D, is equal to a distance of approximately half a card, so that when the upper left set of photocells PC–A is reading the first column and the lower left set of photocells PC–B is reading the second column, the upper right set of photocells PC–C and lower right set of photocells PC–D are reading the columns 81 and 82, respectively. As the card 24 traverses from right to left, passing under the print wheels 18, 20, the photocell carriage 16 moves from right to left at one-half the card speed, so that the card 24 is read "on the fly" by the photocell carriage 16 and is printed "on the fly" by the print wheels 18, 20. It should be noted that the term "on the fly" as used with respect to the photocell carriage in this application refers to the linear movement of the photocell carriage in the direction of the movement of the record member, and the term "on the fly" as used with respect to the print wheels refers to relative movement of the print wheels and record member caused by the combination of the motion of the record member and the rotation of the print wheels, said print wheels having no motion other than rotation.

FIG. 2 shows the electrical switch 10 coupled to the motor 12, which motor 12 drives the code drum 14 and the print wheels 18, 20. FIG. 2 illustrates the electrical logic circuitry.

The actuation of the switch 10 closes an electric circuit from the source V to the motor 12 and further actuates the other electrical components. The motor 12 is coupled by a suitable shaft and gearing to drive the print wheels 18 and 20. The motor 12 further drives a code drum 14.

The code drum 14 provides a plurality of output signals: SET, STEP, CLEAR, and PRINT signals.

The CLEAR signal is generated by the code drum 14 at the initiation of every column cycle. The SET signal is generated once following the CLEAR signal, during each column cycle. STEP pulses are generated by the code drum 14 for each character on the code drum 14, and, in one embodiment, 51 step pulses are generated for each column cycle. The code drum 14 also provides a PRINT pulse following each STEP pulse. Thus, 51 PRINT pulses are provided interlaced with the 51 STEP pulses.

Referring to FIG. 2, a signal is generated indicative of the presence or absence of a carriage return operation. For convenience, the term "$\overline{\text{CARRIAGE}}$ $\overline{\text{RETURN}}$" indicates that the machine is not undergoing a carriage return operation (hence, the logical NOT symbol).

An "ODD-EVEN" flip-flop 32, having an input trigger terminal T and a reset terminal R, upon having a pulse applied to its reset terminal R, is adapted to apply an output signal to its "0" output terminal. Upon application of successive pulses to the trigger terminal T, the "ODD-EVEN" flip-flop 32 provides output signals alternately to the output terminals 1 and 0. Thus, at its initial condition, upon the application of the $\overline{\text{CARRIAGE}}$ $\overline{\text{RETURN}}$ signal to the reset terminal R, the ODD-EVEN flip-flop 32 provides an output signal to its "0" output terminal. The initial CLEAR pulse, applied from the code drum 14 to the ODD-EVEN flip-flop terminal T, causes the ODD-EVEN flip-flop 32 to assume the "1" output condition. The next CLEAR pulse applied to the trigger terminal T switches the flip-flop 32 to its "0" state. Likewise, a subsequent CLEAR pulse applied to the terminal T switches the flip-flop 32 to its "1" state, and so on.

A first three-input AND gate 34 receives one input from the SET signal generated by the code drum 14, a second input from the "1" output terminal of the ODD-EVEN flip-flop 32, and third input from the $\overline{\text{CARRIAGE}}$ $\overline{\text{RETURN}}$ signal. A second three-input AND gate 36 receives the SET signal, the "0" output terminal of the ODD-EVEN flip-flop 32, and the $\overline{\text{CARRIAGE}}$ $\overline{\text{RETURN}}$ signal.

The four sets of PC–A, PC–B, PC–C, PC–D of six photocells Y, X, 8, 4, 2, 1 each are oriented together by means of a common carriage 16, as shown in FIG. 1.

As a card 24 is being read, a suitable light source (not shown) is applied to the opposite side of the card 24 so that light passes through the various perforations of the card 24 to actuate various ones of the photocells PC–A, PC–B, PC–C, PC–D, 1 through 6, inclusive. The photocells, when energized, provide an output signal therefrom.

One input of a two-input AND gate 381 receives the output of the upper left ODD photocell PC–AY. A second two-input AND gate 382 has one input coupled to receive the output from the adjacent photocell PC–AX. A third two-input AND gate 383 has one input coupled to receive the output of the photocell PC–A8. Fourth, fifth, and sixth two-input AND gates 384, 385, and 386 are coupled to receive one input, respectively, from the photocells PC–A4, PC–A2, and PC–A1.

A set of six two-input AND gates 401, 402, 403, 404, 405, and 406 have one input coupled to receive the outputs from the photocells PC–BY, PC–BX, PC–B8, PC–B4, PC–B2, and PC–B1, respectively.

In a similar manner, two-input AND gates 411, 412, 413, 414, 415, and 416 are coupled to receive, at one input, respectively, the outputs from the photocells PC–CY, PC–CX, PC–C8, PC–C4, PC–C2, and PC–C1, respectively.

Another set of two-input AND gates 421, 422, 423, 424, 425, and 426 are coupled to receive one input, respectively, from the EVEN photocells PC–DY, PC–DX, PC–D8, PC–D4, PC–D2, and PC–D1, respectively.

The output of the AND gate 34 is coupled to the remaining inputs of the "low, odd" AND gates 381, 382, 383, 384, 385, 386 and to the remaining inputs of the "high, odd" AND gates 411, 412, 413, 414, 415, 416. The output of the AND gate 36 is coupled to the remaining inputs of the "low, even" AND gates 401, 402, 403, 404, 405, 406, and, also, to the "high, even" AND gates 421, 422, 423, 424, 425, 426.

Six OR circuits or buffers 431, 432, 433, 434, 435, 436 are coupled to the outputs of the AND gates 381, 401; 382, 402; 383, 403; 384, 404; 385, 405; and 386, 406, respectively. In addition, the OR circuit 436 also receives the STEP PULSE from the code drum 14.

Another set of six OR circuits 531, 532, 533, 534, 535, 536 is coupled to receive the outputs from the AND gates 411, 421; 412, 422; 413, 423; 414, 424; 415, 425; and 416, 426, respectively. In a similar fashion the OR circuit 536 receives the STEP pulse from the code drum 14.

A counter 44, comprising six flip-flops 441, 442, 443, 444, 445, 446 has all its reset terminals coupled to receive the CLEAR signal from the code drum 14.

The "1" output terminal of the flip-flop 446 is coupled to the input of the OR circuit 435. Similarly, the "1" output terminal of the flip-flop 445 is coupled to the OR circuit 434; the "1" output terminal of the flip-flop 444 is coupled to the OR circuit 433; the "1" output terminal of the flip-flop 443 is coupled to the OR circuit 432; and the "1" output terminal of the flip-flop 442 is coupled to the OR circuit 431. The output of each OR circuit 431 through 436, inclusive, is coupled, respectively, to the trigger terminal T of the corresponding flip-flop 441 through 446, inclusive. Thus, the counter 44, as described, provides a carry function through each of the stages. In a similar fashion, the counter 45 is associated with the "high columns" photocells PC–CY through PC–C1 and PC–DY through PC–D1. The counter 45 comprises flip-flops 451, 452, 453, 454, 455, and 456. The CLEAR signal from the code drum 14 is coupled from the reset terminals R of the flip-flops 451 through 456, inclusive.

The "1" output terminal of the flip-flop 456 is coupled to the OR circuit 445; the "1" output terminal of the flip-flop 455 is coupled to the OR circuit 444; the "1" output terminal of the flip-flop 454 is coupled to the OR circuit 443; the "1" output terminal of the flip-flop 453 is coupled to the OR circuit 442; the "1" output terminal of the flip-flop 452 is coupled to the OR circuit 441, thereby providing carry throughout the counter 45.

The OR circuits 441, 442, 443, 444, 445, and 446 are coupled to trigger terminals T of flip-flops 451 through 456, respectively.

Seven-input AND gates 46 receives six of its inputs from the output of the counter 44; namely, the outputs of the flip-flops 441 through 446, respectively, the seventy input being the PRINT signal from the code drum 14. The output of the AND gate 46 is coupled to an actuator 47 which co-acts with the print wheel 18. The actuator 47 when energized effectuates printing in known fashion.

Likewise, seven-input AND gate 48 has six of its inputs coupled to receive the output of the counter 45, namely, the outputs of the flip-flops 451 through 456, respectively, the seventh input being the PRINT signal from the code drum 14.

Upon the coincidence of the output signals from the counter 44 together with the PRINT signal, the AND gate 46 provides an output to actuate the actuator 47. Similarly, the coincidence of outputs from the counter 45, together with the PRINT signal, actuates the AND gate 48 to cause the actuator 49 to strike against the corresponding print wheel 20.

In operation, at the beginning of a card cycle, as the card 24 passes under the photocells PC–A, PC–B, PC–C, and PC–D, the $\overline{\text{CARRIAGE}}$ $\overline{\text{RETURN}}$ signal is activated, causing the ODD-EVEN flip-flop 32 to reset, providing an output signal from its "0" output terminal to the AND gate 36. The $\overline{\text{CARRIAGE}}$ $\overline{\text{RETURN}}$ signal activates the AND gates 34 and 36. At the beginning of the column cycle for column 1, the CLEAR signal, generated by the code drum 14, triggers the ODD-EVEN flip-flop 32 switching it into its "1" output state, thereby providing an energizing signal to the AND gate 34 and removing its signal from the AND gate 36.

The CLEAR signal from the code drum 14, in addition to triggering the ODD-EVEN flip-flop 32 for changing its state from a "0" condition to the "1" condition, is coupled to reset the flip-flops 441 through 446, and 451 through 456, inclusive, placing the counters 44 and 45 in the reset condition.

Following the CLEAR signal from the code drum 14, the SET pulse is generated from the code drum 14 and applied to the gates 34 and 36. The gate 34 opens and provides signals to the AND gates 381 through 386, inclusive, and the AND gates 411 through 416, inclusive, thereby activating the outputs from the ODD photocells PC–AY through PC–A1 and PC–CY through PC–C1.

The character punched in the first column, column 1, is read by the photocells PC–AY, PC–AX, PC–A8, PC–A4, PC–AL, PC–A1; the character punched in column 81 is read by the photocells PC–CY, PC–CX, PC–C8, PC–C4, PC–C2, PC–C1.

The character read by the "low" ODD photocells PC–AY, PC–AX, PC–A8, PC–A4, PC–A2, PC–A1 is passed through the AND gates 381 through 386, inclusive, and, hence, through the OR circuits 431 through 436 to set the flip-flops 441 through 446, inclusive, comprising the counter 44, thereby storing the representation of the character read by the "low" ODD photocells PC–AY through PC–A1 into the counter 44.

Similiarly, the character read by the "high" ODD photocells PC–CY, PC–CX, PC–C8, PC–C4, PC–C2, PC–C1 is passed through the AND gates 411, 412, 413, 414, 415, 416, and, hence, through the OR circuits 441, 442, 443, 444, 445, 446 to set the flip-flops 451, 452, 453, 454, 455, 456, comprising the counter 45, thereby storing the representation of the character read by the "high" ODD photocells PC–CY through PC–C1 into the counter 45.

The code drum 14 provides, alternately, STEP and PRINT pulses, one of each being generated for each character on the print wheel 18, 20. The STEP pulse from the code drum 14 is applied through the OR circuit 436 and the OR circuit 446 to step the counters 44 and 45, respectively.

When, after receiving a number of step pulses from the code drum 14, the counter 44 provides all ONES as output therefrom to the AND gate 46, the immediately following PRINT pulse opens the AND gate 46, providing an output therefrom to energize an actuator 47. The actuator 47 strikes the card 24 against a suitable inked ribbon in co-action against the print wheel 18. The character imprinted upon the top row of the card 24 corresponds to the character read by the photocells PC–AY, PC–AX, PC–A8, PC–A4, PC–A2, and PC–A1.

Similarly, after the counter 45 has been stepped a number of times (depending upon the character detected), the counter 45 provides an all ONES output therefrom to the AND gate 48 which, upon receiving the immediately following PRINT pulse, opens to provide energization to the actuator 49. The actuator 49 strikes the card 24 against the print wheel 20 so that the character imprinted upon the bottom row of the card 24 corresponds to the character read by the photocells PC–CY, PC–CX, PC–C8, PC–C4, PC–C2, and PC–C1.

Since printing occurs while the card 24 is in motion, and the character selection function is initiated at a definite point in the rotation of the print wheel 18, 20, the card 24 moves along its path of travel a different distance for each character to be printed. To compensate for this variation in distance moved, the characters are stamped on the periphery of each print wheel 18, 20 in a helical path. Thus, the last character on a print wheel, for a given column, is imprinted on the face of the card 24 at the same point as the first character. The lead angle of the helical path is sufficient to compensate for the distance moved by the card 24 during print wheel 18, 20 rotation.

At the next column cycle, a CLEAR pulse is generated by the code drum 14 to trigger the ODD-EVEN flip-flop 32, placing it into its "0" state, thereby activating the AND gate 36, so that, upon the subsequent SET pulse, from the code drum 14, the gate 36 provides an output therefrom to activate the AND gates 401 through 406, inclusive, and 421 through 426, inclusive. The AND gates 381 through 386 and 411 through 416 are closed. The EVEN columns 2 and 82 of the card 24 are read by the PC–BY, PC–BX, PC–B8, PC–B4, PC–B2, PC–B1 photocells, and PC–DY, PC–DX, PC–D8, PC–D4, PC–D2, PC–D1 photocells, respectively. The character in column 2 is read by the PC–B photocells and is passed through the AND gates 401 through 406, through the OR circuits 431 to 436, and stored in the counter 44. Similarly, the counter 45 stores the character read by the PC–DY, PC–DX, PC–D8, PC–D4, PC–D2, PC–D1 photocells. The counters 44 and 45 are stepped by the subsequent STEP pulses from the code drum 14, and when a counter 44, 45 provides an all ONES condition to its output, the next PRINT pulse to be applied to the corresponding AND gate 46, 48 actuates the respective actuator 47, 49 to print the character to appear under the print wheel 18, 20, respectively.

Thus, each column on the card 24 is sensed by one of the four groups of photocells: group PC–AY, PC–AX, PC–A8, PC–A4, PC–A2, PC–A1; the group PC–BY, PC–BX, PC–B8, PC–B4, PC–B2, PC–B1; the group PC–CY, PC–CX, PC–C8, PC–C4, PC–C2, PC–C1; and the group PC–DY, PC–DX, PC–D8, PC–D4, PC–D2, PC–D1. The photocell groups are positioned over different areas of the card, one group PC–A senses the upped (odd) columns in the low numbered half of the card containing columns 1, 3, 5, 7, . . . 79; another group PC–B senses the lower (even) columns in the left half of the card containing columns 2, 4, 6, 8, . . . 80; the third group PC–C senses the upper (odd) columns in the right half of the card (columns 81, 83, 85, 87, . . . 159), and the fourth group PC–D senses the lower (even) columns in the right hand of the card 24 (columns 82, 84, 86, 88, . . . 160). The two groups of photocells of PC–AY through PC–A1 and PC–CY through PC–C1, which sense the upper card columns, are enabled at the same time, so that the column 1 and the column 81 are sensed simultaneously. The two lower groups PC–BY through PC–B1 and PC–DY through PC–D1, also, are enabled together, so that the columns 2 and 82 are simultaneously sensed. The photocells are mounted in a carriage 16. The PC–A, PC–B photocell assembly is separated from the PC–C, PC–D photocell assembly by the distance between the columns 1 and 81 of the card. Each of the associated upper and lower photocell groups PC–A, PC–B, and PC–C, PC–D, respectively, is offset from one another by one half of the center line distance between two adjacent columns. When the upper group of photocells PC–A, PC–C is positioned over the respective columns, the lower group PC–B, PC–D is over areas of the card between punched holes, and vice versa.

As the card 24 moves from right to left through the machine, the photocell carriage 16 moves in the same direction, during sensing, at about one-half the rate of speed of the card. As a result, the period of time necessary for each column to be sensed, selected, and printed is greater than would be the case with the photocell carriage stationary. Since the time permitted for sensing and printing each column is increased, the space between printed characters on the face of the card 24 is increased also, and the printed lines are extended to a length slightly less than a row of punched holes. As each column is sensed and printed, the ODD-EVEN flip-flop 32 is triggered to select the next consecutive column for sensing. Thus, the columns are sensed in numerical order and the left and right halves of the card are sensed simultaneously.

To select a character on the print wheel 18, 20 which corresponds with the hole pattern sensed, the card information is placed in its complement form in a six-stage counter 44, 45. The counter 44, 45, respectively, is stepped by the code wheel drum 14 until the counter holds all ONE's, at which time the character currently in position is printed. The sequence of characters at the base of the print wheels 18, 20 is the same as the sequence of hole patterns when listed in binary form in an arithmetic progression. A complemented binary form of the hole pattern is placed in the counter 44, 45, and the counter is increased, the increments depending on the number of binary steps between adjacent characters. By the time the counter 44, 45 reaches a state of all ONE's, the corresponding print wheel 18, 20 has revolved to place the character sensed above the corresponding hammer or actuator 47, 49. The code wheel drum 14 contains a sufficient number of pulses in the required sequence to step the counter 44, 45 from any initial quantity to a full condition in the time required for the print wheel to revolve to the selected character.

The code wheel drum 14 and the print wheels 18, 20 are driven by a common source at the same rate of speed, the gearing system preventing the two units from losing their synchronization. Because of the synchronous nature of the machine, the code wheel drum 14 and the print wheels 18, 20 will be in the same initial position in their cycle of rotation each time the information is transferred to the counter 44, 45. Depending on the pattern sensed, the print wheel 18, 20 must turn past a number of characters before the correct character is in position to be printed. The distance between the initial position and the position of the correct character determines the number of times the counter 44, 45 must be advanced to reach the full condition.

The two print wheels 18, 20 are located in positions to print on the top and bottom edges of the card, the hammer or actuator 47, 49 being located beneath each print wheel. The hammer 47, 49 is thrown against the appropriate character upon energization thereof. The contents of the columns 1 through 80 are printed across the top of the card. On the lower line are printed the contents of columns 81 through 160. Because of the movement of the carriage 16 during the card cycle, the printed characters do not appear in line with any particular columns. Thus, a character does not represent a hole pattern of the column immediately above or below.

The operation of the ribbon feed can operate in known manner; the illustration of the ribbon being deleted from the drawing in order to simplify an understanding of this invention.

An interpreter, constructed in accordance with one embodiment of this invention, can be a desk top printing device, having, by way of example, an over-all dimension of 33" x 20" x 20" with an approximately weight of 100 pounds, installable on a flat table surface and positionable in any location.

In one operative embodiment, by way of illustration, the mechanical components of the interpreter were contained in an enclosure 20" long, 15" wide, and 9" high. At one end of the enclosure, an opening was provided for a card feed magazine into which cards were placed for interpreting. At the other end of the machine, a receiver pocket was provided into which cards were ejected after printing.

The input voltage for operation of the unit was 115 volts, 60 cycle A.C., applied directly to a power control circuit. When the on-off switch was depressed, primary power was applied immediately to the drive motor, and an electrical circuit in parallel was completed, supplying power to D.C. power supplies and to transformers for providing the voltage for operation of the photocell light sources. In addition, the picker-knife solenoid was energized and the equipment prepared for operation.

The inked ribbon, through which a character impression is made on the card, was contained on two reels and stretched between the reels past the two printing positions. Ribbon drive was provided by a gear and train assembly by the main drive chain. Two ribbon capstans, one at the front of the machine, and the other at the rear of the machine, were driven continuously. Ribbon passed over these capstans, leaving the feed reel and entering the take-up reel. Two pinch rollers, one for each capstan, provided the friction necessary to drive the ribbon in either direction. The pinch rollers were brought into contact with the capstans alternately by operation of a ribbon solenoid. The solenoid activated mechanical linkage to raise one pinch roller and lower the other. The ribbon solenoid was activated by a latching relay. Energizing or de-energizing the relay depended on the positions of ribbon limit switches. When the front ribbon reel was full, one set of switches were closed, the ribbon control relay was unlatched, and the ribbon was fed from the front wheel toward the rear reel. When the rear reel became full, another set of switches closed, latching the relay and energizing the ribbon solenoid. The relay remained latched, even after power was removed, and the ribbon fed from the rear reel to the front reel until the direction was reversed again.

The cards to be interpreted were placed in the card magazine at the right-hand end of the machine. Cards were fed into the sensing station, one card at a time, by a cam operated picker knife. The card feed cam turned continuously as long as the motor was operating, and the picker knife assembly moved with the contour of the cam. The assembly was pulled toward the sensing station by springs and was returned by a cam follower. The picker knife solenoid was energized during the power sequencing cycle and remained energized until power was removed. When the solenoid was energized, the picker knife assembly was released to move with the cam. Until the solenoid was energized, the picker knife was held stationary against the tension of its springs. The feeding of cards into the sensing station occurred in a continuous cycle at an approximate rate of 23 cards per minute.

In an operative embodiment, constructed in accordance with this invention, the code wheel drum 14 was a continuously revolving magnetic drum which provided a sequence of pulses for the selection of the appropriate character to be printed. Five pulse tracks were provided on the drum, each of which was amplified and the outputs were routed to a control circuit to implement the printing function. The CLEAR track contained a pulse which appeared once each revolution of the drum for resetting the character counters 44, 45 and for triggering the flip-flop 32. The SET pulse followed the CLEAR pulse by a short time interval once each drum revolution and was used to gate the information into the character counters 44, 45. STEP pulses appeared on a pair of tracks, their number and repetition rate being a function of the number of binary steps between the code combinations of adjacent characters on the print wheel. The STEP pulses on one track advanced the character counter from the $2^0$ stage providing counting increments of one division on the binary scale. The STEP pulses on the other track advanced the counter from the $2^2$ stage providing counting increments of four divisions on the binary scale. The PRINT sprocket appears once for each character on the print wheel. Each sprocket appeared immediately after the pulses. The print sprocket probed the output of the character counter to print the character at the appropriate time. At the beginning of each card cycle, the photocell carrier 16 was driven in the direction of the card motion, and sensing begun. Column 1 and column 81 were sensed by the upper groups of photocells, and the complement of the column contents was transferred to the character counters by the SET pulse from the code wheel drum. When the drum completed a revolution, the contents of these columns were printed, one character appearing on the upper line and the other character appearing on the lower line of print. The next CLEAR pulse cleared the character counters and triggered the ODD-EVEN flip-flop, selecting the lower group of photocells for sensing. The contents of column 2 and 82 were sensed, and the complements were transferred to the character counters. The appropriate characters were printed during the completion of the drum revolution and another character appeared on each of the lines of print. This process continues until all card columns were sensed and their contents printed, at which time, the carriage was returned to its starting point to begin the next card sensing operation.

Thus, a single operating switch 10 applies power to the machine, and all mechanical components are driven by a common source V. The drive motor 12, coupled to the electrical source V by the switch 10, can rotate (by way of example) at a speed of 1275 r.p.m. The drive motor 12 is mechanically coupled to the code wheel 14. Other mechanical parts of the mechanism are driven by a suitable worm and gear assembly (illustrated by dotted lines) affixed to the code wheel shaft. The picker knife assembly, the card feed rollers, and the photocell carriage cam are all driven by the gear train. Although the variation in gear ratios may cause some components to be driven at a different rate of speed than others, all mechanical components are driven continuously whenever power is applied to the machine.

The interpreter can sense and print cards at an approximate rate of 23 cards per minute. A card cycle consists of 100 cycle points: 1 cycle point for sensing and printing a single column. Since printing is performed on two columns at a time, a complete print cycle, all 160 columns, consumes 80 column points of machine operation, 20 cycle points remaining for the space between the last and first columns on adjacent cards. The code wheel 14 and the two print wheels 18, 20 make one revolution per cycle point, or 100 revolutions per card cycle. The photocell carriage 16 is cam-driven and spring-returned. The carriage assembly 16 rides on two guide rods, and is driven in the direction of the card motion by a turning cam at the beginning of each card cycle. When the contents of all card columns have been printed, the carriage is returned by spring tension to its starting point. Each of the two print wheels 18, 20 contains 51 positions around its periphery, of which 40 positions are occupied by characters. Eleven positions are left blank so that the actuator hammer has sufficient time to return to its rest position before the next character is to be printed.

The "160-column" card interpreter involves relatively few functional concepts in this operation. The content of the card column is sensed, the character is selected on the print wheel corresponding to the hole pattern sensed, and the selected character is printed on the face of the card. The functions of sensing, selection, and printing are performed for each column of the card while the card moves through the machine.

It will, of course, become obvious to those skilled in the art to make minor variations, such as, for example, printing on the reverse side of the card. It is desired, however, that this invention be construed broadly and that it be limited solely by the scope of the allowed claims.

We claim:

1. In combination, (a) means for tarnsferring a record member having a character recorded therein in one form of recordation;

(b) means for reading said record member; and (c) means for creating a second recording of said character onto said record member;

(d) means coupled to said reading means and said recording means for causing the character of said second recording to correspond to the character of said one form of recordation, said transferring means moving said record member continuously past a stationary reference point at a given rate of speed, said reading means being moved with respect to said reference point in the same direction as the movement of the record member and at a different given rate of speed; and said means for creating a second recording being moved for character selection purposes.

2. The combination as claimed in claim 1 wherein, said reading means moves with respect to said reference point at a speed less than said given rate during a reading operation.

3. The combination as claimed in claim 2 wherein said second recording is provided in a different form of recordation from said first mentioned form of recordation.

4. The combination as claimed in claim 3 further comprising:

(e) a motor; and (f) means coupling said motor to said means for transferring said second recording means.

5. The combination as claimed in claim 3 wherein said record member is a card.

6. The combination as claimed in claim 5 wherein, said one form of recordation is by punched holes, and said second recording is by printing, and wherein said reading means is a hole sensing means, and said second recording means is a printing means and wherein said reading means includes:

means for reading an aligned column of said record member, and means for reading a second aligned column of said record member; and wherein said second recording means includes, means for printing along one line of said record member, and means for printing along another line of said record member, said two lines being vertically separated from one another.

7. The combination as claimed in claim 5 wherein, said means for reading includes means for reading a first aligned column of said record member, means for reading a second aligned column of said record member, means for reading a third aligned column of said record member, means for reading a fourth aligned column of record member, and a carriage for holding said four last mentioned means in spaced relation wherein said means for reading said first aligned column is displaced from said means for reading a second aligned column a distance equal to the displacement between said means for reading said third aligned column and said means for reading said fourth aligned column, and wherein said means for reading said first aligned column is displaced from said means for reading a third aligned column a distance equal to the displacement between said means for reading a second aligned column and said means for reading a fourth aligned column, and wherein said carriage means is movable with respect to said reference point; and wherein said means for creating a second recording includes means for printing along one line of said record member, and means for printing along another line of said record member.

8. The combination as claimed in claim 7 further comprising:

(e) a motor; and (f) means coupling said motor to said means for transferring, reading and creating a second recording.

9. The combination as claimed in claim 8 wherein the combination further comprises:

(g) a code drum; and (h) means coupling said code drum to said motor; and wherein, said means for reading said first aligned column includes at least six photocells, said means for reading said second aligned column includes at least six photocells, said means for reading said third aligned column includes at least six photocells, said means for reading said fourth aligned column includes at least six photocells, said means for printing along one line includes a print wheel and an associated actuator for printing along said record member;

said means for printing along a second line includes a second print wheel and a second associated actuator for printing along another line of said record member;

said coupling means to said reading and recording means includes a first flip flop having a first and a second output, said flip-flop being reset when said transfer means initiates the transfer of a record member, and being triggered upon the receipt of a clear pulse from said code drum;

a first and gate coupled to receive a set output from said code drum, said first output of said flip flop, and a signal present when said transfer means transfers a record member;

a second and gate coupled to receive a set output from said code drum, said second output of said flip-flop, and said signal present when said transfer means transfers said record member;

a first set of six two input and gates, each coupled respectively to receive the corresponding outputs of said at least six photocells and each coupled to receive the output of said first and gate;

a second set of six two input and gates, each coupled respectively to receive the corresponding outputs of said at least six photocells and each coupled to receive the output of said second and gate;

a third set of six two input and gates, each coupled respectively to receive the corresponding outputs of said six photocells and each coupled to receive the output of said first and gate;

a fourth set of two input and gates which are at least six in number, each coupled respectively to receive the corresponding outputs of said at least six photocells and each coupled to receive the output of said second and gate;

a first set of at least six OR circuits coupled to receive respectively the outputs of said first and second sets of two input and gates;

a second set of six OR circuits coupled to receive respectively the output of said third and fourth sets of two input and gates;

a first six stage counter coupled to receive and be set by the outputs of said first set of OR circuits, said first counter adapted to be cleared by a CLEAR signal from said code drum and adapted to be stepped by a STEP signal from said code drum;

a second six stage counter coupled to receive and be set by the outputs of said second set of OR circuits, said second counter adapted to be cleared by said CLEAR signal from said code drum and adapted to be stepped by said STEP signal from said code drum;

a first seven input and gate coupled to receive six outputs from said first six stage counter and a PRINT signal from said code drum;

a second seven input and gate coupled to receive the six outputs from said second six stage counter and said PRINT signal from said code drum;

means coupling the output of said first seven input and gate to said first mentioned actuator; and means coupling the output of said second seven input and gate to said second actuator.

10. The combination as claimed in claim 1 wherein said one form of recordation is by punched holes and said second recording is by printing.

11. The combination as claimed in claim 10 wherein, said means for reading includes means for reading one column of said record member, and means for reading a second column of said record member; and said means for creating a second recording includes means for printing along one line of said record member, and means for printing along another line of said record member, said first and second lines being vertically separated from one another.

12. The combination as claimed in claim 10 wherein;

said reading means includes means for reading one portion of said record member, and means for reading a second portion of said record member; and said second recording means includes means for printing along one line said record member, and means for printing along a second line of said member vertically separated from said first mentioned line.

13. The combination as claimed in claim 12 wherein, said means for reading one portion of said record member is a set of photocells;

said means for reading said second portion of said record member is a second set of photocells;

said means for printing along one line is a rotating print wheel for printing along the top of said record member; and said means for printing along a second line includes a rotating print wheel for printing along the bottom of said record member.

14. The combination as claimed in claim 13 wherein, said record member is a card, and wherein said combination further comprises, (e) a motor; and (f) means coupling said motor to said means for transferring, reading and creating a second recording.

15. The combination as claimed in claim 1 wherein; said reading means is a hole sensing means and said means for creating a second recording is a printing means.

16. The combination as claimed in claim 15 wherein said record member is a card and wherein the combination further comprises:

(e) a motor; and (f) means coupling said motor to said means for transferring said reading means and said second recording means.

References Cited

UNITED STATES PATENTS

| | | | |
|---|---|---|---|
| 1,608,837 | 11/1926 | Bryce | 101—93 |
| 1,620,068 | 3/1927 | Bryce | 197—20 XR |
| 1,785,999 | 12/1930 | Bryce | 197—20 |
| 2,053,063 | 9/1936 | Bryce | 101—93 |
| 2,776,618 | 1/1957 | Hartley | 101—93 |
| 2,843,243 | 7/1958 | Masterson | 101—93 XR |
| 2,926,602 | 3/1960 | MacDonald et al. | 101—93 |
| 2,980,227 | 4/1961 | Handley | 197—20 |
| 3,232,404 | 2/1966 | Jones | 197—49 |
| 3,283,701 | 11/1966 | Ritzerfeld | 101—91 |

EDGAR S. BURR, Primary Examiner

U.S. Cl. X.R.

101—93; 235—61.9